Patented July 25, 1939

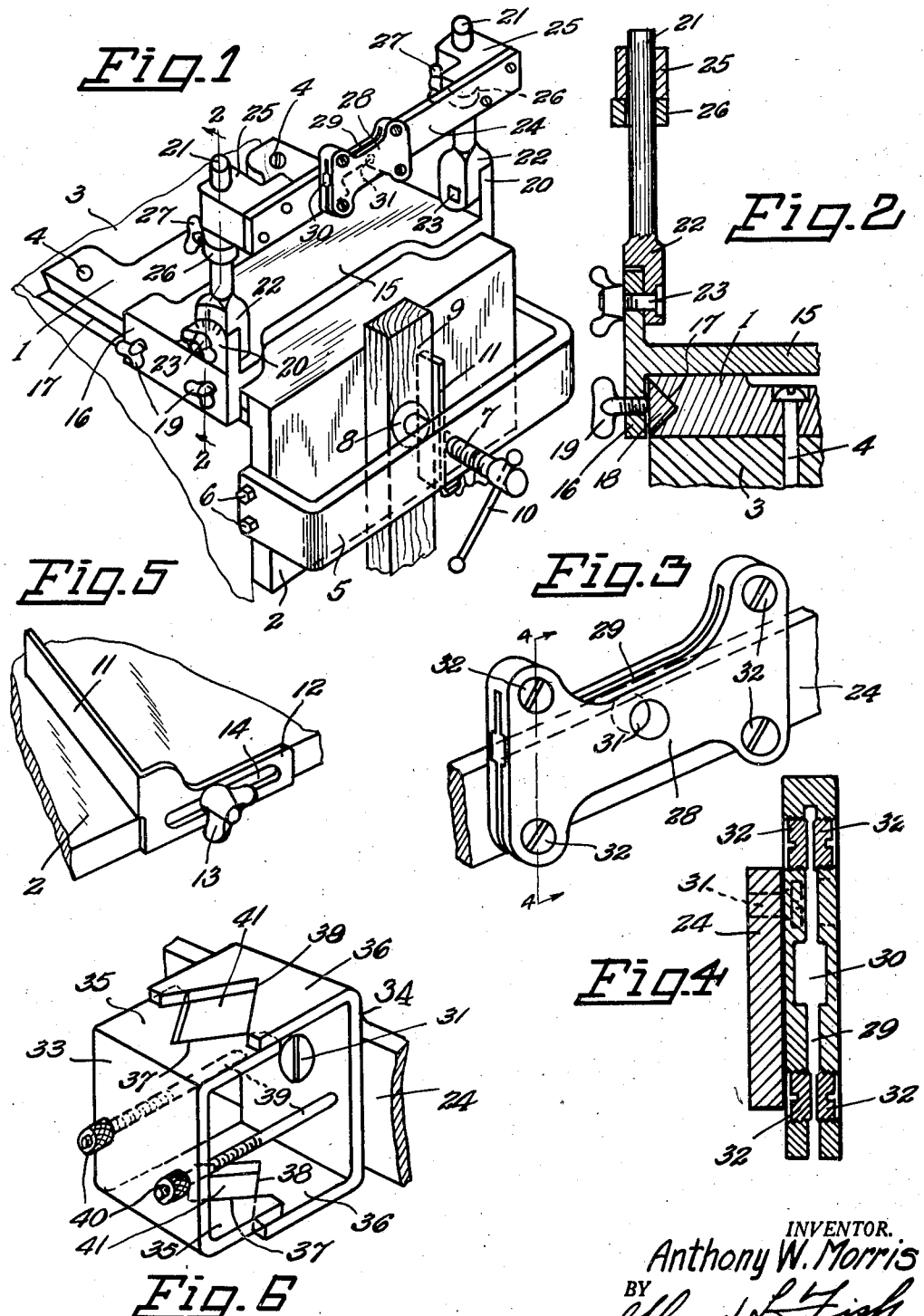

2,167,082

UNITED STATES PATENT OFFICE 2,167,082

TENON CUTTER

Anthony W. Morris, Spokane, Wash.

Application May 25, 1938, Serial No. 210,026

4 Claims. (Cl. 145—129)

This invention relates to a tenon cutting device and it is one object of the invention to provide a device of this character which is adapted to be applied to a work bench and by means of which a board or the like may be held and an end thereof cut to form a tenon which may be a straight tongue or of dovetail formation.

Another object of the invention is to so form the device that when it is applied to a work bench a board may be firmly held in an upright position at an end or side of the work bench and a saw mounted over the bench and disposed in position to cut a tenon of the desired form.

Another object of the invention is to provide the device with a bench engaging base and a bed shiftable along the base and carrying saw holding means which is adjustable to dispose a saw at the proper angle for forming a straight cut tenon or a tenon of the dovetail type.

Another object of the invention is to so mount the saw carrier that it may be vertically adjusted and prevent a tenon from being cut too deep.

Another object of the invention is to provide a device of this character having a saw carrier which may be easily slid along the base and then very firmly secured in set position.

Another object of the invention is to provide the work holder with improved means for firmly securing the work and maintaining same in a vertical position so that the tenon will be properly cut.

Another object of the invention is to provide a drill guide which may be substituted for the saw carried and serve to maintain a drill bit in a vertical position while boring a hole or socket in a board or wooden beam.

The invention is illustrated in the accompanying drawing, wherein:

Figure 1 is a perspective view showing the improved tenon cutter applied to a portion of a work bench.

Fig. 2 is a fragmentary sectional view taken vertically along the line 2—2 of Fig. 1.

Fig. 3 is a perspective view of the saw guide forming part of the saw holder.

Fig. 4 is a sectional view taken vertically through the saw guide along the line 4—4 of Fig. 3.

Fig. 5 is a perspective view of the guide for holding the work in a vertical position.

Fig. 6 is a perspective view of a drill guide which may be substituted for the saw guide.

This improved tenon cutter has a base 1 formed of strong metal and having a depending wing or flange 2 at one end which engages one end of the work bench 3 upon which the base 1 is secured by a suitable number of bolts 4. A yoke 5 which is U-shaped and formed of strong metal, extends transversely of the wing 2 in spaced relation thereto and is secured by screws 6 which pass through the arms of the yoke and into edge faces of the wing or flange 2. A screw clamp 7 is threaded through the yoke and has a swiveled head 8 at its inner end for engaging the work 9 and, at its outer end, is provided with the usual turning handle 10, by means of which it is turned in order to tighten or loosen the clamp. When the work is secured by the clamp it should be in a vertical position and in order to assure proper positioning of the work, there has been provided a guide 11 consisting of a metal strip having a foot 12 at its lower end which extends laterally from the strip and is disposed flat against the lower edge face of the wing 2 to which it is secured by a thumb screw 13 engaged through a slot 14 formed longitudinally in the foot or base 12. By providing the slot, the guide may be adjusted transversely of the wing and accommodate itself to the width of the work which is to have its upper end cut to form a tenon.

A bed plate 15 extends transversely across the base 1 and has depending flanges 16 at its ends which overlap edge faces of the base. A groove 17 is formed along each edge face of the base and in each groove is engaged a wedge 18 consisting of a strip which is triangular in cross section, as shown in Fig. 2, and engaged by set screws 19 which, when tightened, cause the wedge to be forced inwardly into tight binding fit in the groove. Therefore, the bed may be shifted along the base 1 and securely held in set position.

Arms 20 extend upwardly from ends of the bed plate and above these arms or lugs are posts 21 having enlarged base portions 22 through which pass bolts 23 serving as pivots for the posts. Gauge markings are provided upon the arms 20 and the base portions of the posts so that when the nuts of the bolts are loosened, the posts may be moved and accurately set and the nuts then tightened to hold the posts in adjusted position. A cross bar 24 extends between the posts and, at its ends, is secured to blocks 25 which are slidable vertically upon the posts and rest upon collars 26 carried by the posts and secured in set positions thereon by set screws 27. By having the cross bar mounted as shown, it may be shifted vertically to a raised position when starting a cut to form a tenon and, as downward movement of the cross bar will be limited by engagement of the blocks 25 with the collars 26, the depth of the cut may be controlled and a long or short tenon accurately cut.

A back saw or bench saw of conventional design is used for cutting the work and forming the tenon and this saw, which is not illustrated, is slidably carried by a saw guide or block 28 which is formed of strong metal and provided with a slot or kerf 29 in which the saw operates. Opposed portions of the kerf are deepened to form a channel 30 in which the back strip of the saw engages to slidably mount the saw and in order to pivotally mount the block upon the cross bar there has been provided a screw 31 which is inserted through an opening in the outer leaf of the block and after being passed through the inner leaf, is screwed into a threaded opening in the cross bar. The saw may, therefore, be reciprocated longitudinally and also tilted during a cutting operation and, by loosening the bolts 23 and adjusting the posts 21, the saw may be angularly adjusted and caused to cut the upper end of the work in such manner that either a straight tenon may be formed or a dovetail tenon. Plugs or guides 32, formed of lignum vitae or other material bearing an oily substance, are screwed into threaded openings formed in corner portions of the block 28 and, when properly adjusted, engage side faces of the saw to prevent lateral play of the saw and act as lubricating means so that the saw may slide freely.

When this tenon cutting device is in use it is applied to the work bench as shown in Fig. 1 and the work 9 disposed vertically against the wing or flange 2, where it is secured by the clamp 7 with one side edge face in contact with the guide 11. The work will thus be firmly secured in a vertical position perpendicular to the upper face of the base and project upwardly from the base as far as desired. The carriage or bed plate 15 is now shifted along the base to a position which will dispose the block 31 and a saw carried thereby over the work and the posts adjusted to cause the saw to cut a straight tenon or a dovetail tenon and the collars 26 adjusted vertically upon the posts to limit the depth to which the saw may cut into the work. Therefore, the length of the tenon will be controlled and, when the saw is reciprocated through the block to cut the work, a tenon of only a predetermined length will be formed.

If it is desired to bore the work from its upper end to form a socket instead of a tenon, the block 28 is removed and a bit guide, shown in Fig. 6, substituted. This guide consists of companion jaws 33 and 34 formed of sheet metal and having arms 35 and 36 formed with registering recesses 37 and 38. The jaw 34 is secured to the cross bar 24 by the screw 31 and carries pins 39 which pass through the jaw 33 and carry nuts 40 by means of which the jaw 33 is adjusted upon the pins or stems 39 to a position in which the arms 35 and 36 will overlap to such an extent that a bit of certain size may turn freely in the openings 41 defined by the registering recesses 37 and 38 but held in a vertical position and prevented from having lateral play.

Having thus described the invention, what is claimed is:

1. In an apparatus of the character described, a base, a depending wing at one end of said base, a yoke carried by said wing and projecting outwardly therefrom, a clamp carried by said yoke for holding work firmly against said wing, a guide strip extending vertically against said wing, an arm extending laterally from the lower end of said guide against the lower edge face of said wing and formed with a longitudinal slot, a fastener for said guide extending through said slot for securing the guide in a set position for engaging a side edge face of work of a predetermined width, a carrier shiftable along said base toward and away from said wing, and means carried by said carrier for supporting a saw over work held by the clamp.

2. In an apparatus of the character described, a base, a depending wing at one end of said base, a yoke carried by said wing and projecting outwardly therefrom, a clamp carried by said yoke for holding work firmly against said wing, a guide strip extending vertically against said wing and adjustable transversely thereof into position for engaging the side edge face of work of a predetermined width, a carrier shiftable along said base toward and away from said wing, and means carried by said carrier for supporting an implement over said work.

3. In an apparatus of the character described, a base, work holding means carried by said base, a bed plate extending transversely across said base and having depending flanges at its ends overlapping side edge faces of said base, the side edge faces of the base being grooved longitudinally, wedging strips in said grooves, set screws threaded through said flanges and engaging said strips for forcing the strips inwardly into gripping engagement with the grooved edge faces of said base and holding the bed plate in a set position, posts extending upwardly from said bed plate and angularly adjustable, and means carried by said posts for supporting an implement over work carried by said work holder.

4. In an apparatus of the character described, a base, work holding means carried by said base, a bed plate extending transversely across said base and shiftable along said base, arms rising from said bed plate at opposite ends thereof, posts having enlarged base portions pivoted to said arms and having arcuate shoulders overlying arcuate upper edge faces of said arms, the arms and base portions of said posts having cooperating scale markings for indicating angular positions of the posts, collars shiftable vertically upon said posts, blocks slidable vertically upon said posts and limited in their downward movement by engagement with said collars, a cross bar extending between and secured at their ends to said blocks, and a saw holder pivoted to said cross bar.

ANTHONY W. MORRIS.